3,349,049
URETHANE COATINGS FROM HYDROXYL TERMINATED POLYESTERS PREPARED FROM DIMER ACIDS

Joseph J. Seiwert and Jack B. Boylan, Cincinnati, Ohio, assignors to Emery Industries, Inc., Cincinnati, Ohio, a corporation of Ohio
No Drawing. Filed Sept. 30, 1963, Ser. No. 312,322
6 Claims. (Cl. 260—22)

This invention relates to the field of urethane coatings of the type formed by reacting a hydroxyl terminated polyester with a polyfunctional isocyanate. The invention lies in the discovery that an improved coating can be obtained by using $C_{36}$ dicarboxylic (dimer) acids instead of short chain acids to form the polyester reactant.

Heretofore the intermediate polyester component of the coating has been prepared by reacting a polyol such as ethylene glycol, diethylene glycol, propylene glycol, glycerine, trimethylolpropane, or butylene glycol with a relatively short chain, aliphatic, saturated, dibasic acid such as adipic, azelaic, or sebacic acid. The proportions of the respective glycol and acid reactants employed have been such that the resulting polyesters have a minimum hydroxyl functionality of 2, the product having a free hydroxy group at each end of the molecule. The preparations are so conducted that the products have acid values below 20 (usually less than 5) and hydroxyl values ranging from about 50 to 400 or even 500 in some cases. The polyester intermediates have molecular weights ranging from about 300 to 3,000.

In forming the urethane coating, the polyester has been reacted with a polyfunctional isocyanate such as toluene diisocyanate, hexamethylene diisocyanate or p,p'-diphenylmethane diisocyanate. Also employed are diisocyanate prepolymers such as those formed by the reaction of toluenediisocyanate with polyols such as glycerine or trimethylol propane, such prepolymers containing no free hydroxy groups. These isocyanates are usually employed in the form of a solution in an organic solvent such as xylene, toluene or 2-ethoxy-ethylacetate, and the same may also be said of the polyester component.

In carrying out the process, the user blends the polyester component with the isocyanate component (employing a catalyst such as benzyl dimethylamine, if desired) in the presence of a solvent of the type referred to above. Once prepared, this two-component system is rapidly painted or otherwise applied to the substrate to be coated. Curing will thereafter take place at ambient temperatures over periods ranging from several hours to as long as a week or more for complete curing.

In some cases it is desired that the curing of the two-component mixture proceed only at elevated temperatures (e.g., 250°–350° F.) rather than at generally ambient temperatures such as 40°–125° F. This can be accomplished by chemically blocking the isocyanate groups of the polyisocyanate reactant with phenol groups. This blocked structure is formed by reacting the isocyanate with phenol, thus forming a component which is stable up to temperatures of about 200° F. even in the presence of the polyester reactant. However, as the mixture is thereafter heated to above 250° F., the blocked isocyanate liberates phenol (which vaporizes off), thus leaving the isocyanate groups free to react immediately with the hydroxyl groups of the polyester to form the desired urethane coating.

The present invention fits in the framework of the technique described above, the basis of the invention being the discovery that coatings of greatly improved characteristics can be obtained by using an intermediate polyester reactant prepared from a novel combination of acids and a conventional polyol. The acid mixture employed is made up from 10 to 80 mol percent of long chain, dicarboxylic (dimer) acid prepared by the polymerization of a $C_{18}$ unsaturated acid and from 20 to 90 mol percent of a low molecular weight, unsaturated dibasic acid such as maleic, phthalic, succinic acid or anhydrides thereof, isophthalic acid, fumaric acid or mixtures of said acids and anhydrides. Optionally, the acid mixture may also include an amount of from about 10 to 70 mol percent of an aliphatic monobasic acid containing from about 9 to 22 carbon atoms in the molecule such as pelargonic, lauric, myristic, palmitic, oleic, stearic, behenic, linoleic acids.

The composition of glycol-acid mixture employed is such as to provide an excess of at least 2 equivalents of the glycol over and above the total number of equivalents of acid present in the mixture. In other words, the reactants should be so selected, and the stoichiometric proportions of the respective acid and polyol reactants be so adjusted, as to give hydroxy-terminated, polyester molecules each theoretically having a hydroxyl functionality of 2 or more. When monobasic acids are employed in the acid mixture, it is necessary to employ at least one mol of a triol for each mol of monobasic acid used if a product of the desired hydroxy-terminated structure is to be obtained.

As stated above, the acid mixture employed in forming the polyester intermediate contains the $C_{36}$ dicarboxylic acid product known as dimer acid. Processes for forming this acid are well known and form the subject of numerous U.S. patents, including Nos. 2,482,761, 2,793,220, 2,793,221 and 2,955,121. In carrying out said dimer-forming operations, unsaturated fatty acids such as oleic, linoleic and linolenic acid, or mixtures of such acids (usually admixed with saturated fatty acids), all of essentially $C_{18}$ chain length, are heated in the presence of water, or in the presence of both water and an active clay mineral, to induce polymerization. The polymeric fatty acid reaction mixtures so prepared contain from about 30 to 75% by weight of acid polymer, with the balance of the mixture representing $C_{18}$ monocarboxylic (monomer) acids of one type or another which are distilled from the mixture once the polymerization operation is concluded. If desired, the non-polymerized $C_{18}$ acids so recovered can be employed as the monocarboxylic acid component of the acid mixture reacted with the polyol to form the polyester intermediate. The residual polymer fraction consists essentially of dimer ($C_{36}$ dicarboxylic acids) together with amounts up to about 20–22% of $C_{54}$ trimer. However, the trade customarily refers to this dimer-trimer mixture as "dimer," and this practice is followed herein. These polymerization reaction products can be used in the form in which they are recovered from the polymerization unit, or they can be given a partial or complete hydrogenation treatment to reduce unsaturation before being reacted with the polyol compound to form the polyester. This is also true for the monomeric portion of the product in case the same is to be employed in forming the polyester.

Urethane coatings prepared from an adipic acid-based polyester are recognized as the standard of the trade. The coatings of this invention compare very favorably with those based on adipate, they having superior chemical resistance, better flexibility and impact resistance, better flow or leveling characteristics, better solubility in hydrocarbon solvents and a lower specific gravity thus making for greater surface coverage per unit of weight.

For any given system, coating properties are a function of several factors. For example, said properties are controlled primarily by the functionality and the molecular weight of the polyester intermediate, increased functionality and lower molecular weight both tending to increase hardness, to decrease flexibility and impact resistance, and to impair chemical resistance. As explained below, the compositions of this invention compare favorably with those based in adipic acid at equivalent polyester functionality and molecular weight and at essentially the same NCO/OH ratios.

The manner in which the present invention finds application is illustrated by the following examples wherein Examples I, II, III and IV show the invention in various of its embodiments, while Examples V and VI are inserted for comparative purposes. The latter examples are based on polyesters prepared from adipic acid, and it is intended that Examples V be compared with the products of Examples II and III, while Example VI is to be compared with Example IV.

Table I given below presents the composition of the starting mixture employed in each of the examples to form the polyester intermediate, the properties of the latter also being shown. The preparation of each polyester was effected in a conventional fashion by heating the mixture at about 220° C. using an inert gas purge to remove the water of esterification, the reaction being terminated when the indicated acid and hydroxyl values were reached.

TABLE I

| Example No. | Polyester Composition in Equivalents | | | | | |
|---|---|---|---|---|---|---|
| | I | II | III | IV | V | VI |
| Dimer Acid [1] | 1.0 | 0.67 | 1.2 | 1.25 | | |
| Phthalic anhydride | 1.0 | 0.67 | 0.4 | 1.4 | | |
| Maleic anhydride | | 0.67 | 0.4 | 1.4 | | |
| Tall oil fatty acid [2] | | | | 1.0 | | |
| Adipic Acid | | | | | 4.0 | 5.0 |
| Diethylene glycol | 2.0 | | | 0.5 | 2.0 | |
| Trimethyl propane | 1.5 | 4.5 | 4.5 | 7.5 | 4.5 | 9.3 |

| | Polyester Characteristics | | | | | |
|---|---|---|---|---|---|---|
| Approx. Functionality | 3 | 5 | 5 | 5 | 5 | 5 |
| Hydroxyl No. (solids) | 155 | 298 | 236 | 149 | 245 | 145 |
| Acid No. (solids) | 3.8 | 3.1 | 2.9 | 5.0 | 4.0 | 4.2 |
| Percent Non-Volatiles | 100 | 80 | 80 | 85 | 100 | 100 |
| Lbs./Gal | 8.74 | 9.17 | 8.67 | | 9.72 | |
| Approx. Mol. Wt | 1,100 | 1,000 | 1,200 | 2,000 | 1,100 | 2,000 |

[1] Dimer prepared from tall oil fatty acids. Contains approx. 87% dimer, 17% trimer and a trace of monomer.
[2] Tall oil fatty acids made up of approx. equal amounts of oleic and linoleic acids.

These polyesters were respectively blended with an isocyanate-terminated prepolymer prepared from one mol of trimethylol propane and three mols of toluene diisocyanate, the resulting prepolymer having three reactive isocyanate groups per mol available for reaction with the hydroxyl groups of the polyesters. The respective polyesters were blended with this isocyanate prepolymer in such ratios that the resulting blends all had 1.1/1.0 ratios of free isocyanate groups to free hydroxyl groups. In all cases sufficient amounts of toluene and Cellosolve acetate were added to the blends to achieve the desired workability and percent solids (about 50% solids). In the cases of the adipate based systems, a cellulose-acetate-butyrate flow control agent had to be added in the amount of 1% based upon the resin solids. All these blends are reactive systems and have limited pot life. The blends were applied as .003 in. wet films to various substrates and allowed to cure for 1 week at room temperature.

These panels were then used for physical testing. The film properties are given below in Table II.

TABLE II

| Example No. | Clear Film Physical Properties | | | | | |
|---|---|---|---|---|---|---|
| | I | II | III | IV | V | VI |
| Sward Hardness | 40 | 59 | 52 | 55 | 58 | 46 |
| Flexibility (¼" Mandrel bend) | Pass | Pass | Pass | Pass | Pass | Pass |
| U.V. Resistance,[1] 120 hrs., ΔY | 30.6 | 35.3 | 34.4 | | 26.6 | |
| Surface Characteristics | Excel. | Excel. | Excel. | Excel. | Excel.[2] | Excel. |

[1] Determined on Gardner Multipurpose Anto. Reflectometer.
[2] This coating exhibited cratering and pin holes when no cellulose-acetate-butyrate flow control agent was added.

In the chemical tests reported in Table III below the polyester-isocyanate blends were reduced to a viscosity appropriate for dipping glass test tubes. Examples I, II, III and V were reduced to 30% solids with a 50/30/20 ratio of cellosolve acetate/xylene/toluene, and Examples IV and VI were reduced to 40% solids in a 50/50 mixture of cellosolve acetate and xylene. Glass test tubes were then dipped into these resin solutions and allowed to drain and dry for one week at ambient temperatures. These tubes were then immersed in chemical solutions, and under the conditions, as indicated in Table III. The results reported in said Table are in terms of a scale ranging from 0 to 10, where the score of 10 is the highest possible rating.

TABLE III

| Example No. | Chemical Resistance of Characteristic Films | | | | | |
|---|---|---|---|---|---|---|
| | I | II | III | IV | V | VI |
| H₂O (212° F.): | | | | | | |
| 1 hr | 8 | 10 | 10 | 10 | 8 | 8 |
| 3 hrs | | 8 | 8 | 10 | 6 | 2 |
| 2% NaOH (160° F.): | | | | | | |
| 1 hr | 8 | 10 | 10 | 10 | 0 | 6 |
| 3 hrs | | 8 | 10 | 10 | 0 | 2 |
| 2% HCl (160° F.): | | | | | | |
| 2 hrs | 8 | 10 | 10 | | 4 | |
| 4 hrs | | 10 | 8 | | 2 | |
| 1% Tide (160° F.): | | | | | | |
| 2 hrs | 6 | 10 | 10 | 10 | 8 | 2 |
| 5 hrs | | 10 | 10 | 10 | 6 | 0 |

We claim:
1. A package made of separate components, A and B, which on being mixed together cure to form a protective coating when cast in a film-form on a substrate, said component A being an organic solution of a polyfunctional compound containing a plurality of available isocyanate groups, and component B being a hydroxyl-terminated polyester formed from a polyol and a mixture of carboxylic acids made of 10 to 70 mol percent dimer acids, from 20 to 80 mol percent of an acid selected from the group consisting of maleic acid, phthalic acid, isophthalic acid, fumaric acid, succinic acid, maleic anhydride, phthalic anhydride, succinic anhydride, and mixtures of said acids and said anhydrides, and from 10 to 70 mol percent of an aliphatic, monobasic acid containing from 9 to 22 carbon atoms, said polyester having a hydroxyl functionality of at least 2, an acid value below about 5, a hydroxyl value of at least 50, and a molecular weight of from about 300 to 3000.

2. The product of claim 1 wherein the mixture of carboxylic acids contains from 10 to 70 mol percent dimer acids, from 20 to 80 mol percent of phthalic anhydride and from 10 to 70 mol percent of distilled, tall oil fatty acids.

3. The product of claim 1 wherein the mixture of carboxylic acids contains from 10 to 70 mol percent dimer acids, from 20 to 80 mol percent of a mixture of phthalic anhydride and maleic anhydride and from 10 to 70 mol percent of distilled, tall oil fatty acids.

4. A urethane coating comprising the cured reaction product of an organic solution of a compound containing a plurality of available isocyanate groups with a hydroxyl-terminated polyester formed from a polyol and a mixture of carboxylic acids made of from 10 to 70 mol percent of dimer acids, from 20 to 80 mol percent of an acid selected from the group consisting of maleic acid, phthalic acid, isophthalic acid, fumaric acid, succinic acid, maleic anhydride, phthalic anhydride, succinic anhydride, and mixtures of said acids and said anhydrides, and from 10 to 70 mol percent of an aliphatic, monobasic acid containing from 9 to 22 carbon atoms, said polyester having a hydroxyl functionality of at least 2, an acid value below about 5, a hydroxyl value of at least 50, and a molecular weight of from about 300 to 3000.

5. The product of claim 4 wherein the mixture of carboxylic acids contains from 10 to 70 mol percent dimer acids, from 20 to 80 mol percent of phthalic anhydride and from 10 to 70 mol percent of distilled, tall oil fatty acids.

6. The product of claim 4 wherein the mixture of carboxylic acids contains from 10 to 70 mol percent dimer acids, from 20 to 80 mol percent of a mixture of phthalic anhydride and maleic anhydride and from 10 to 70 mol percent of distilled, tall oil fatty acids.

References Cited

UNITED STATES PATENTS

| 2,802,795 | 8/1957  | Simon et al.   | 260—22 |
| 3,007,894 | 11/1961 | Bunge et al.   | 260—22 |
| 3,057,824 | 10/1962 | Le Bras et al. | 260—22 |
| 3,106,537 | 10/1963 | Simon et al.   | 260—22 |
| 3,109,824 | 11/1963 | Heiss          | 260—22 |
| 3,207,709 | 9/1965  | Merten et al.  | 260—75 |
| 3,244,673 | 4/1966  | Bruin et al.   | 260—75 |

FOREIGN PATENTS 773,897  5/1957  Great Britain.

OTHER REFERENCES

Dombrow, Reinhold Plastics Applications Series Polyurethanes, Reinhold Publishing Corp. New York, 176 pages, pp. 99 and 100 of interest.

DONALD E. CZAJA, *Primary Examiner.*

LEON J. BERCOVITZ, *Examiner.*

R. W. GRIFFIN, *Assistant Examiner.*

UNITED STATES PATENT OFFICE
CERTIFICATE OF CORRECTION

Patent No. 3,349,049                               October 24, 1967

Joseph J. Seiwert et al.

It is certified that error appears in the above identified patent and that said Letters Patent are hereby corrected as shown below:

Column 3, TABLE I, first column, line 7 thereof, "Trimethyl propane" should read -- Trimethylol propane --.

Signed and sealed this 3rd day of March 1970.

(SEAL)
Attest:

Edward M. Fletcher, Jr.                      WILLIAM E. SCHUYLER, JR.

Attesting Officer                                Commissioner of Patents